United States Patent [19]
Mahlich et al.

[11] Patent Number: 4,800,805
[45] Date of Patent: Jan. 31, 1989

[54] ESPRESSO MACHINE WITH CAPPUCCINO MAKING ATTACHMENT

[75] Inventors: Gotthard C. Mahlich, Kronberg; Michael Borgmann, Solingen, both of Fed. Rep. of Germany

[73] Assignee: Robert Krups Stiftung & Co. KG., Solingen, Fed. Rep. of Germany

[21] Appl. No.: 100,339

[22] Filed: Sep. 23, 1987

[30] Foreign Application Priority Data

Sep. 24, 1986 [DE] Fed. Rep. of Germany ....... 3632375
Dec. 24, 1986 [DE] Fed. Rep. of Germany ....... 3644519

[51] Int. Cl.$^4$ ............................................. A47J 31/40
[52] U.S. Cl. ..................................... 99/293; 99/323.1; 261/121.1; 261/DIG. 76
[58] Field of Search ................. 99/279, 300, 293, 294, 99/323.1; 426/433; 261/DIG. 76, 16, 121.1

[56] References Cited

U.S. PATENT DOCUMENTS

| | | | |
|---|---|---|---|
| 2,743,916 | 5/1956 | Bornwasser | 261/121.1 |
| 4,204,465 | 5/1980 | Knecht | 99/293 |
| 4,644,856 | 2/1987 | Borgmann | 99/294 |
| 4,660,466 | 4/1987 | Fries | 99/294 |

*Primary Examiner*—Robert W. Jenkins
*Attorney, Agent, or Firm*—Peter K. Kontler

[57] ABSTRACT

An espresso machine with an attachment for the making of cappuccino wherein the attachment has a pipe with an open air admitting inlet at its upper end and an open air discharging outlet at its lower end. The steam conduit of the espresso machine has an orifice for steam at its lower end, and the outlet of the pipe is positioned in such a way that steam issuing from the orifice draws air into the pipe and out by way of the outlet to mix with steam and to froth a quantity of milk when the resulting mixture is admitted into a body of milk in a cup or another vessel. The pipe can be a separately produced part which is separably and adjustably or integrally connected to the conduit. It is also possible to provide the conduit with an integral portion which serves as an air supplying pipe and to provide a coupling to separably connect the upper end of the conduit to the source of steam. An extension can be provided to allow for mixing of air and steam before the resulting mixture is caused to enter into and to froth a supply of milk. The extension can constitute an integral part of the conduit or a separately produced part which has a funnel-shaped portion surrounding a conical portion of the steam discharging nozzle of the conduit.

26 Claims, 3 Drawing Sheets

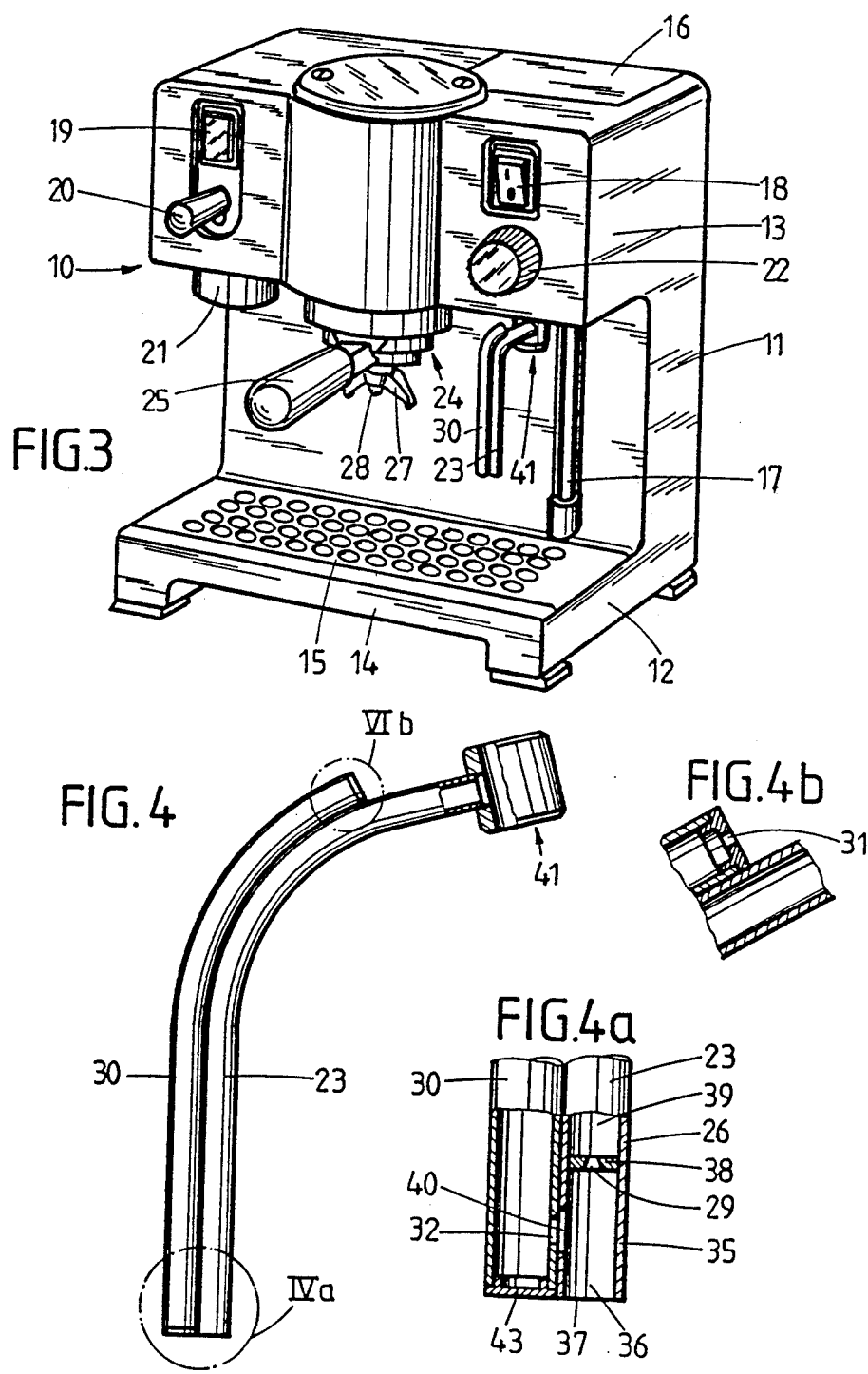

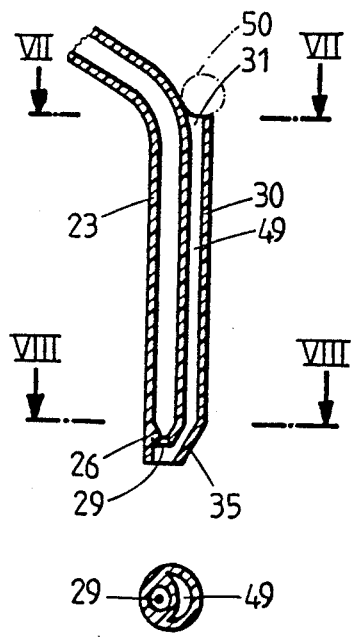
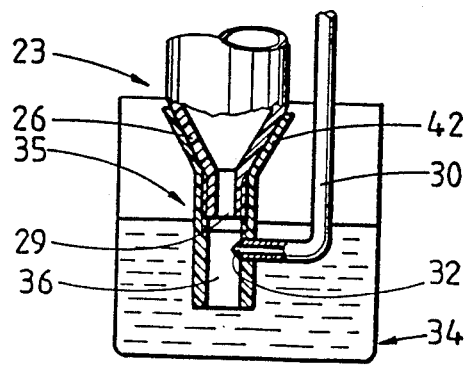

ESPRESSO MACHINE WITH CAPPUCCINO MAKING ATTACHMENT

CROSS-REFERENCE TO RELATED CASE

The espresso machine of the present invention is similar to that shown in the commonly owned copending design patent application Ser. No. 054,585 filed May 27, 1987 for "Combined espresso and cappuccino making machine".

BACKGROUND OF THE INVENTION

The present invention relates to espresso machines, and more particularly to improvements in espresso machines of the type capable of making cappuccino coffee.

It is well known to use an espresso machine for the making of cappuccino, i.e., a beverage containing coffee and frothed milk. A vessel, such as a cup, containing a quantity of milk is placed onto the base of an espresso machine at a level below the customary conduit which is provided with a steam discharging nozzle at its lower end. The nozzle is caused to dip into the body of milk and discharges steam. In order to promote the admission of air into the body of milk, the vessel is moved up and down relative to the nozzle so as to speed up the frothing process. Such procedure is time-consuming and requires a certain amount of expertise, namely proper positioning of the nozzle with reference to the vessel and a proper frequency and amplitude of up and down movements of the vessel. In addition, the just described mode of frothing milk in an espresso machine can cause injury or shock to the operator, for example, if the vessel contains a relatively small quantity of milk and the vessel is lowered to a level at which steam can escape above or close to the upper level of milk so that droplets of milk are sprayed all over and around the espresso machine including the garment of the operator.

It was further proposed to surround the nozzle of the steam supplying conduit with a cylindrical jacket through which air is drawn in response to opening of the valve which initiates the discharge of hot steam. The jacket has holes which are provided in its periphery and serve to admit air which is then sucked down the jacket and out at the lower end to penetrate into the body of milk. The jacket is further formed with at least one inlet for milk so that the lower part of the jacket contains a mixture of steam, air and milk. Such mixture leaves the conduit by way of the orifice in the nozzle and forms a froth. The just described machine exhibits the advantage that it is not necessary to move the vessel relative to the steam supplying conduit and that frothing of milk requires a minimum of expertise. On the other hand, the provision of a cylindrical jacket with openings for admission of air and milk contributes to the initial cost of the machine, especially if the jacket is to be removable so as to allow for convenient cleaning on a daily basis or at longer or shorter intervals.

OBJECTS AND SUMMARY OF THE INVENTION

An object of the invention is to provide an espresso machine which can be used to froth milk with hot steam even though the steam supplying conduit need not be provided with a jacket for admission of air and milk.

Another object of the invention is to provide an espresso machine wherein the milk-containing vessel need not be moved with reference to the steam supplying conduit.

A further object of the invention is to provide an espresso machine with a simple, compact and inexpensive cappuccino making attachment which can be readily cleaned and can be permanently or separably assembled with the steam supplying conduit.

An additional object of the invention is to provide a novel and improved steam supplying conduit for use in an espresso machine which is designed for the making of cappuccino.

Still another object of the invention is to provide an espresso machine which can be used to froth milk by a skilled attendant in a commercial establishment as well as by an unskilled person without any danger of injury and/or contamination of the area around the machine.

An additional object of the invention is to provide a novel and improved method of converting an espresso machine into an appliance which can froth milk for use in the preparation of cappuccino.

Another object of the invention is to provide a simple, compact and inexpensive attachment which can be used in combination with an existing espresso machine to make frothed milk preparatory to the making of cappuccino.

The invention is embodied in an espresso machine which comprises a source of steam, steam supplying first conduit means having a steam discharging orifice, and air supplying second conduit means having an air discharging outlet adjacent the orifice so that steam which issues by way of the orifice draws air from the second conduit means by way of the outlet. The orifice is preferably oriented to discharge steam downwardly. The second conduit means can include a first end portion which is provided with the outlet and a second end portion which is provided with an air-admitting inlet. Thus, the entire attachment need not include any part or parts other than the second conduit means.

If the second conduit means is a separately produced component, the machine can further comprise means for properly locating the second conduit means with reference to the first conduit means; such locating means can include means for connecting the second conduit means directly to the first conduit means. The connecting means can comprise means for separably coupling (e.g., clamping) the second conduit means to the first conduit means. The coupling or connecting means can be designed to connect the second conduit means to an elongated portion of the first conduit means so that the second conduit means is movable longitudinally of the elongated portion. The outlet can be oriented to discharge air downwardly, i.e., in the direction in which steam preferably issues from the orifice of the first conduit means.

The first conduit means can comprise a substantially straight end portion which is adjacent the orifice, and the second conduit means can include a substantially straight first portion which is adjacent and preferably at least substantially parallel to the end portion of the first conduit means. Such second conduit means can further comprise an arcuate (e.g., substantially Z-shaped or S-shaped) second portion which is a downward extension of the first portion, which is provided with the outlet, and a part of which extends forwardly beyond the end portion of the first conduit means so that steam which issues from the orifice of the end portion flows along the aforementioned part of the second portion of the second conduit means.

The first conduit means can include an extension which may but need not always be integral with the remainder of the first conduit means and receives steam from the orifice. The outlet of the second conduit means is then arranged to discharge air into the extension so that steam which issues from the orifice mixes with air in the interior of the extension. The latter has a discharge opening for the thus obtained mixture of air and steam. A vessel can be provided to store a supply of milk, and the extension can dip into the supply of milk in such vessel so that the mixture of steam and air which issues from the extension causes a frothing of milk in the vessel. The first conduit means includes a tubular portion which is adjacent the extension and an internal partition which is disposed between the tubular portion and the extension and is provided with the aforementioned orifice. The second conduit means can comprise an end portion which is adjacent the extension and is provided with the outlet. The extension can comprise a tubular wall having an aperture which registers with the outlet of the end portion of the second conduit means. The aperture of the tubular wall is located between the partition and the discharge opening of the extension. The conduits of such espresso machine can include pieces of tubing which are adjacent and parallel to each other. Such pieces of tubing can be connected (e.g., welded) to each other. Furthermore such pieces of tubing can have identical or similar inner and/or outer diameters. The two conduits can be integral with each other, and the machine then further comprises means for directly or indirectly coupling the first conduit means to the source of steam.

The second conduit means can constitute an integral part of the first conduit means, and such integral part further comprises an air-admitting inlet which is or can be remote from the air discharging outlet, and an elongated channel which connects the inlet with the outlet. The channel can extend in parallelism with an elongated straight portion of the first conduit means.

The machine can include a discrete (separately produced) extension surrounding that (end) portion of the first conduit means which is provided with the orifice. The arrangement is preferably such that a first portion of the extension surrounds the end portion of the first conduit means and a second portion of the extension receives steam from the orifice and air from the outlet of the second conduit means. The second portion of the extension can include a tubular wall which is provided with an aperture in register with the outlet of the second conduit means so that air which is drawn into the second portion by steam entering the second portion by way of the orifice is mixed with steam before the mixture leaves by way of a discharge opening at that end of the second portion which is remote from the orifice. The end portion of the first conduit means can constitute a nozzle resembling or including a hollow cone, and the first portion of the extension can include or constitute a funnel which receives the cone.

The machine can further comprise means for regulating the flow of air into the air admitting inlet of the second conduit means. Such regulating means can include a suitable flow regulating valve, e.g., a valve having a rotary valving element.

The novel features which are considered as characteristic of the invention are set forth in particular in the appended claims. The improved espresso machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a perspective view of a second espresso machine which is provided with a cappuccino making attachment forming an integral part of the steam supplying conduit;

FIG. 4 is an enlarged elevational view of the steam supplying conduit and of the cappuccino making attachment of the machine shown in FIG. 3;

FIG. 4a is an enlarged sectional view of a detail within the phantom-line circle IVa in FIG. 4;

FIG. 4b is an enlarged sectional view of a detail within the phantom-line circle VIb in FIG. 4;

FIG. 5 is an end elevational view of a modified steam supplying conduit and a cappuccino making attachment which is an integral part of the steam supplying conduit;

FIG. 6 is a vertical sectional view of the structure which is shown in FIG. 5;

FIG. 7 is a horizontal sectional view as seen in the direction of arrows from the line VII—VII of FIG. 6;

FIG. 8 is a horizontal sectional view as seen in the direction of arrows from the line VIII—VIII of FIG. 6; and FIG. 9 is a fragmentary partly elevational and partly sectional view of a steam supplying conduit and of a further cappuccino making attachment dipping into a schematically indicated milk-containing vessel.

DESCRIPTION OF THE PREFERRED EMBODIMENTS

Figure 1:
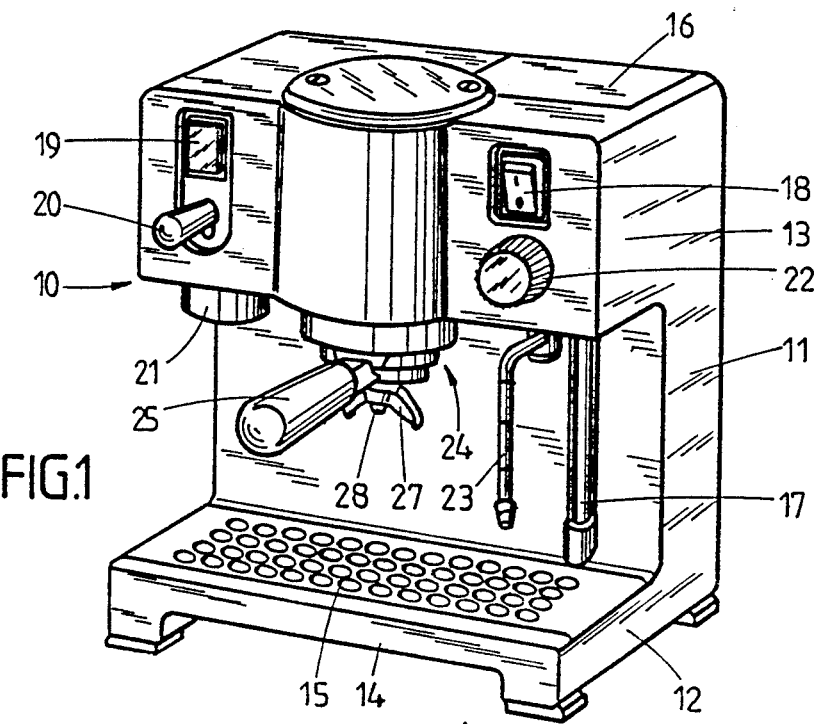
FIG. 1 is a perspective view of an espresso machine which can be converted into a cappuccino maker.

FIG. 1 shows certain parts of an espresso machine 10 which is provided with a novel and improved attachment for the frothing of milk preparatory to the making of milk coffee known as cappuccino. The parts which serve to connect the current-consuming units of the machine 10 to an outlet or to another source of electrical energy have been omitted for the sake of clarity and simplicity. All parts which are not specifically shown but are necessary for proper operation of the machine 10 can be of any conventional design. For example, the construction of the machine 10 can be similar to or identical with that of the electric espresso/cappuccino makers Nos. 966 and 933 which are distributed by the assignee of the present application.

The machine 10 comprises a housing or support including an upright median section 11, a lower section or base 12 which is provided with legs and carries the section 11 at its rear end, and an enlarged upper section or head 13 at the upper end of the section 11. The base 12 extends forwardly beyond the upright section 11 and has a recess for a removable collecting tray 14 which gathers spilled coffee, water and/or milk and is normally overlapped by a sieve-like cover 15 serving as a miniature table for cups or other types of vessels. The cover 15 can be lifted off the base 12 with the tray 14 for periodic cleaning and evacuation of the contents of the tray.

The top wall of the upper section 13 of the housing of the machine 10 has a pivotable or otherwise movable door 16 which can be moved to an open position so as to allow for introduction of a supply of water, e.g., by lifting the entire machine 10 off a table top or counter top and placing the opening which is exposed in response to movement of the door 16 to open position beneath the cold-water faucet in a sink or the like. The section 13 constitutes a source of fresh water as well as a source of hot steam which is obtained in response to heating of water that is drawn from the chamber beneath the door 16. If desired, the chamber beneath the door 16 can be provided in a separable portion of the section 13, i.e., in a discrete water tank which can be detached from the remaining portion of the section 13 for convenient cleaning or refilling with fresh water. The rear side of the water tank can be provided with a pivotable handle (not seen in the view of FIG. 1) so as to allow for convenient manipulation of the tank during removal from the remaining portion of the section 13, during filling and/or cleaning and during reattachment to the remaining portion of the section 13. The median section 11 of the housing of the machine 10 is provided with a front view water level indicator 17 which enables the operator to immediately ascertain the quantity of water in the tank.

A master (on-off) switch 18 at the front side of the section 13 is installed at a level above a rotary steam regulator knob 22. The switch 18 must be closed in order to connect the energy source with a heat-up system which forms hot steam. When the section 13 contains a minimum required quantity of hot steam, a control light 19 at the front side of the upper section 13 lights up. An espresso metering lever 20 is installed beneath the control light 19 and serves to initiate the dispensing of a selected quantity of espresso coffee into a cup or another suitable vessel which is located at a level above the cover 15 to receive a selected quantity of espresso coffee. The construction of parts which are controlled by the lever 20 is known and forms no part of the present invention.

The section 13 of the housing of the machine 10 further supports a customary coffee tamper 21 which can compact pulverulent coffee in the filter in a simple and effective way. The knob 22 can be rotated between a zero (sealing) position, through an infinite number of intermediate positions, and a second end position to effect a discharge of hot steam at an intermediate or at a maximum rate by way of a pivotable or swiveling steam supplying conduit 23 which is coupled to the section 13 (i.e., to the source of steam) at a location to the left of the water level indicator 17. Steam which issues from the orifice 29 of the nozzle 26 (FIG. 2) at the lower end of the conduit 23 can be used to heat cups which are about to receive espresso coffee. In addition, the conduit 23 can cooperate with the improved cappuccino making attachment to froth milk in a vessel, such as the vessel 34 shown in FIG. 2.

FIG. 1 further shows a customary filter carrier 24 which is mounted in the central portion of the section 13 and defines a chamber for a filter. The chamber of the filter carrier is preferably surrounded by metal or another heat-conducting material. On the other hand, a handle 25 at the lower end of the filter carrier 24 is made of a material which is a poor conductor of heat. The carrier 24 further comprises a connector which is disposed between the filter chamber and the handle 25 and can include a bayonet mount to facilitate rapid connection of the unit 24 to or rapid disconnection of such unit from the section 13. An espresso dispensing spout 27 is attached to the filter carrier 24 by a screw 28 or another suitable fastener. The arrangement may be such that the spout 27 can discharge two streams of espresso coffee into two adjoining cups on the cover 15.

In order to enable the machine 10 to froth milk with assistance from steam which is discharged via orifice 29 of the nozzle 26 at the lower end of the straight vertical lower end portion of the conduit 23, there is provided an attachment which includes an air supplying conduit 30 (FIG. 2) with an air admitting inlet 31 at its upper end and an air-discharging outlet 32 at its lower end, and a locating device 33 which serves to preferably separably and adjustably couple the straight upper portion of the conduit 30 to the adjacent straight lower end portion of the conduit 23. The conduit 30 is or can constitute an inexpensive metallic pipe having a straight upper portion which is carried by the connecting or locating device 33, and an arcuate (e.g., substantially Z-shaped or S-shaped) lower portion which is provided with the outlet 32 and is positioned in such a way that the outlet 32 can discharge a stream of air downwardly, i.e., in the direction in which the orifice 29 of the nozzle 26 discharges one or more jets of hot steam into the body of milk (normally skim milk) in the vessel 34 which is then located on the cover 15. Steam which issues from the orifice 29 flows around the lowermost part of the conduit 30 and thus draws a stream of air into the conduit 30 by suction through the inlet 31; such air flows in the conduit 30 toward and issues from the outlet 32 to be mixed with milk and steam in the interior of the vessel 34 and to thereby cause a pronounced and desirable frothing or foaming of milk preparatory to the making of cappuccino coffee. The vessel 34 can but need not be a cup.

The locating or connecting device 33 can constitute a coupling with one or more resilient grasping portions or wings 33a (one shown) which can be spread apart to be placed around the lower end portion of the conduit 23 so as to engage the latter by fricton but to enable an operator to slide the device 33 up and down along the conduit 23 in order to select an optimum distance between the orifice 29 and the air discharging opening 32 as well as to properly select the orientation of the lowermost part of the conduit 30 directly beneath or at one side of the orifice 29. However, it is equally possible to use the device 33 as a means for more or less permanently connecting the conduit 30 to the conduit 23, e.g., by using wings 33a which are too stiff to permit a longitudinal shifting and/or rotation of the conduit 30 relative to the conduit 23. Alternatively, the device 33 can be more or less permanently secured to the conduit 23 (e.g., by a grub screw or the like) and can be provided with means for separably and/or rotatably and/or longitudinally movably coupling the conduit 30 to the conduit 23. For example, the device 33 can be made of a suitable plastic material which is a poor conductor of heat. It is further possible to employ a locating and connecting device which can releasably engage each of the conduits 23, 30 (e.g., by providing it with two pairs of resilient claws) so that the conduit 23 or 30 can be separated from such device or that the device can be separated from both conduits. An advantage of a locating or connecting device which serves as a coupling to separably connect the conduit 30 to the conduit 23 is that the attachment including the conduit 30 and the device 33 can be installed in an existing espresso machine by the simple expedient of coupling the device 33 to the conduit 23 at a proper level above the nozzle 26. Another advantage of a device which constitutes a coupling rather than a means for permanently connecting the conduit 30 to the conduit 23 of the machine 10 is that the conduit 30 can be rapidly detached from the conduit 23 to facilitate cleaning or to be put to storage if the machine 10 is to be used as an espresso maker for a reasonably long period of time.

The operation is as follows:

The machine 10 is set up in the customary way, i.e., in a manner as required to make espresso coffee. When the control light 19 is on to indicate that the section 13 contains a requisite supply of hot steam, the operator can turn the knob 22 to a desired position so that the orifice 29 of the nozzle 26 will discharge steam at a desired rate and pressure. The vessel 34 contains a requisite quantity of skim milk and is placed onto the cover 15 so that the lower end portion of the conduit 23 dips into the body of milk in 34. This means that the air discharging outlet 32 of the conduit 30 is also immersed in the body of milk. When the knob 22 is rotated to leave its zero position, the orifice 29 discharges hot steam at the selected rate and such steam flows around the lowermost part of the conduit 30 to draw fresh air via outlet 32 i.e., the jet or jets of steam issuing from the orifice 29 draw air into the conduit 30 via inlet 31 and cause such air to flow in the conduit 30 toward and to leave this conduit via outlet 32. This results in a frothing of milk in the region of the nozzle 26 and outlet 32. The entire body of milk is converted into a foaming mass within a short interval of time.

An important advantage of the improved attachment 30, 33 is its simplicity and low cost. Such attachment can be rapidly affixed to and rapidly detached from the conduit 23. In addition, and as mentioned above, it is possible to permanently (or more or less permanently) attach the components 30, 33 to the conduit 23 in an optimum position to draw air into and from the conduit 30 in response to movement of the knob 22 from its zero position. The rate of foaming can be regulated at 22 with a high degree of accuracy. Moreover, it is not necessary to move the vessel 34 up and down, and the conduit 23 need not be provided with a permanently or separably installed jacket as in certain conventional espresso machines. It has been found that the improved attachment can be used to foam skim milk or other forms of milk in a simple and efficient way and that such operation requires no skill because the foaming or frothing of milk is carried out automatically as soon as the orifice 29 and outlet 32 are submerged in a body of milk and the knob 22 is moved from its zero position. A supply of milk can be admitted into the vessel 34 after the latter is already positioned in such a way that the conduits 23 and 30 extend into its interior. The conduit 30 can constitute a piece of a commercially available pipe which is cut to a desired length and suitably shaped to ensure that one of its open ends will be located in the range of steam that issues from the orifice 29 of the nozzle 26 at the lower end of the conduit 23 so that the other open end of such converted length of pipe will draw air as soon as the knob 22 is actuated to effect the flow of steam into the conduit 23.

If desired, the device 33 can be modified to carry one or more detent members (e.g., small protuberances) which are receivable in selected longitudinally spaced-apart notches in the periphery of the conduit 23. This renders it possible to locate the conduit 30 in any one of a relatively small or a relatively large number of predetermined positions with reference to the orifice 29 of the nozzle 26, i.e., to locate the outlet 32 at any one of two or more preselected distances from the orifice 29. Angular adjustability of the conduit 30 can be achieved by providing the periphery of the conduit 23 with two or more female detent means in the form of circumferentially extending grooves. A coupling which relies on friction alone is preferred if the maker of the attachment desires to ensure that the conduit 30 can be located in any one of a practically infinite number of different positions, i.e., that the distance of the outlet 32 from the orifice 29 can be varied at will.

It was further ascertained that the foaming or frothing action is particularly satisfactory if the conduit 30 discharges one or more streams of air in the direction in which the jet or jets of steam issue from the nozzle 26 at the lower end of the conduit 23.

Figure 2:
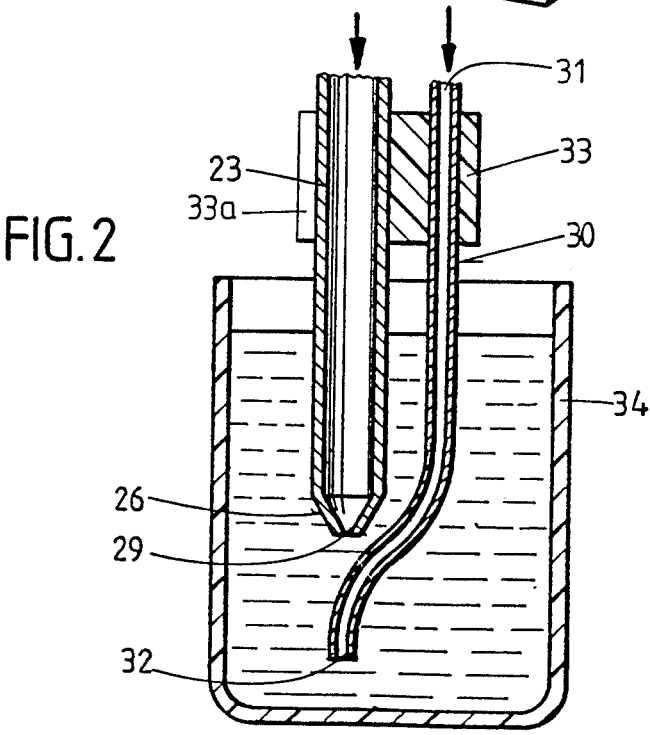
FIG. 2 is an enlarged vertical sectional view of a milk-containing vessel and of an attachment which can be used with the steam supplying conduit of the espresso machine of FIG. 1 to foam milk for the purpose of making cappuccino coffee.

The material of the conduit 30 is preferably selected in such a way that the conduit can be readily bent in available machinery so as to ensure that the lower portion of this conduit will assume a shape corresponding to or resembling that which is shown in FIG. 2. It is normally preferred to configurate and mount the conduit 30 in such a way that the outlet 32 is located rather close to and is in line with the orifice 29 but the lower portion of the conduit 30 cannot prevent escape of steam from the nozzle 26. This ensures that steam which issues at 29 can draw air at an optimum rate.

The espresso machine 10 which is shown in FIG. 3 is identical with the machine of FIG. 1. The difference is that the attachment for the making of cappuccino coffee is integrated into the stream supplying conduit 23 (see particularly FIGS. 4, 4a and 4b). The conduit 23 has an integral hollow tubular extension 35 which is provided with a discharge opening 36 spaced apart from the orifice 29 which is a preferably centrally located opening in an internal partition 38 of the conduit 23 intermediate the tubular portion 39 and the extension 35. The tubular wall of the extension 35 has an aperture 40 which registers with the outlet 32 of the lowermost portion of the air supplying conduit 30. The lower end portion of the conduit 30 contains a plug 43. The upper end portion of the conduit 23 carries one part of a coupling 41 which serves to separably connect the conduit 23 and the attachment (30, 35) with the outlet of the source of hot steam (i.e., with the section 13 of the housing forming part of the espresso machine 10 shown in FIG. 3).

Steam which issues from the orifice 29 in the partition 38 draws air from the conduit 30 via outlet 32 and aperture 40 (the latter is disposed between the partition 38 and the lower end 37 of the extension 36), and such air mixes with steam before the resulting mixture leaves the extension 35 via discharge opening 36 to cause a frothing of milk in a vessel (not shown) into which the extension 35 dips when the attachment including this extension and the conduit 30 is in actual use.

The inner and outer diameters of the conduit 30 preferably match or approximate the inner and outer diameters of the conduit 23 and its extension 35. The conduit 30 can be spot welded or otherwise permanently secured to the conduit 23. The latter includes a straight portion (39) which is integral with the extension 35 and is parallel with and adjacent a straight portion of the conduit 30. FIG. 4b shows that the upper end portion of the conduit 30 contains a plug which is provided with the inlet 31 for admission of air into the attachment. Such air is drawn into the conduit 30 by steam which issues from the orifice 29 of the partition 38 of the nozzle 26 and flows toward the discharge opening 36 of the extension 35.

The conduit 30 is shorter than the conduit 23 in order to ensure that the coupling 41 cannot interfere with the flow of air into the conduit 29 via inlet 31 when the coupling 41 is operative to secure the conduit 23 to the section 13. The coupling 41 of FIG. 4 includes a sleeve which can be slipped onto a nipple (not shown) at the underside of the section 13 and can be held in proper position by a screw or by any other suitable fastener.

FIGS. 5 to 8 show a modification of the structure of FIGS. 4, 4a and 4b. The steam supplying conduit 23 has a nozzle 26 with an orifice 29 which discharges one or more jets of steam downwardly and into a relatively short extension 35 which is integral with the nozzle 26 as well as with an air supplying conduit 30. The latter is an integral part of the conduit 23 (see particularly FIGS. 7 and 8) and has an inlet 31 remote from the outlet which latter discharges air into the interior of the extension 35 when the orifice 29 of the nozzle 26 discharges steam. The inlet 31 and the outlet of the conduit 30 are connected to each other by an elongated channel 49 which is parallel to the adjacent portion of the conduit 23. The coupling (not shown) at the upper end of the conduit 23 can be identical with or similar to the coupling 41 of FIG. 4. The inlet 31 at the upper end of the conduit 30 is spaced apart from the upper end of the conduit 23. FIGS. 7 and 8 show that the cross-sectional area of the channel 49 in the conduit 30 can vary in a direction from the inlet 31 toward the outlet, i.e., toward the extension 35 of the conduit 23.

FIG. 6 shows (by broken lines) an optional device 50 which serves as a means for regulating the rate of admission of air into the channel 49 via inlet 31. Such regulating device can comprise a suitable valve, preferably a valve having a rotary valving element whose angular position determines the rate of admission of air into the conduit 30. Such valves are available on the market.

The structures which are shown in FIGS. 4–4b and in FIGS. 5–8 can be installed in available espresso machines in lieu of simple conduits 23 of the type shown in FIG. 1 so that such available espresso machines can be used to foam milk preparatory to the making of cappuccino coffee. These structures are simple, compact and inexpensive and can be provided with couplings (41) of the type presently used to attach a steam supplying conduit to the source of steam. All this contributes to lower cost and to versatility of the espresso machine and its attachment.

An advantage of the attachments which are shown in FIGS. 3–8 is that the jet or jets of steam issuing from the orifice 29 and flowing into the extension 35 must create suction only in the relatively small internal space of the extension so that the jet or jets of steam can draw air into the conduit 30 at a predictable rate, even when the setting of the knob 22 is such that the rate of steam discharge is relatively low. The surface surrounding the internal space of the extension 35 is not contacted by milk because the outflowing mixture of air and steam prevents entry of milk by way of the discharge opening of the extension. This reduces the likelihood of deposition of milk in the extension and of clogging the orifice, the outlet and/or the discharge opening and/or the aperture 40 of FIG. 4.

It has been found that deflection of the air stream through an angle of approximately 90° during flow from the conduit 30 of FIG. 4 or 6 into the extension 35 does not adversely affect the mixing of air with steam.

While it is possible to permanently connect the conduit 23 of FIG. 4 or 6 with the outlet of the steam source in the section 13 of the housing in the respective espresso machine, the provision of a separable connection (coupling 41 or an analogous coupling) is preferred at this time because it allows for convenient cleaning of the conduit 23 and attachment 30, 35 as well as for replacement of such structure with a conventional steam supplying conduit.

The structure of FIG. 4 exhibits the advantage that the conduits 23 and 30 can constitute pieces of commercially available piping. On the other hand, the structure of FIG. 6 can be produced as a one-piece article which need not be fitted with a separately produced partition.

FIG. 9 shows a portion of a steam supplying conduit 23 having a partly conical nozzle 26 with orifice 29 and a separately produced extension 35 with a funnel-shaped upper portion 42 which receives the nozzle 26 (i.e., it surrounds the orifice 29) and a tubular lower portion which has an aperture for the adjacent lower end of the air supplying conduit 30 and its outlet 32. The jet or jets of steam issuing from the orifice 29 mix with air which is drawn by steam via outlet 32, and the resulting mixture is caused to leave the extension 35 via discharge opening 36 to froth the supply of milk in the vessel 34. The tubular lowermost portion of the conduit 23 can be provided with external threads mating with internal threads of the extension 35 beneath the funnel-shaped upper portion 42. The configuration of the funnel-shaped portion 42 is preferably complementary to that of the conical portion of the nozzle 26.

The structure which is shown in FIG. 9 can be used with the espresso machine 10 of FIG. 1 or 3. When the machine is ready to discharge hot steam, the signal lamp 19 lights up and the operator can begin to discharge steam via conduit 23 in response to appropriate manipulation of the knob 22. This causes the jet or jets of steam which issue via orifice 29 to draw air through the outlet 32 of the conduit 30 (whose upper end is open) so that the extension 35 contains a mixture of air and steam which enters the vessel 34 via discharge opening 36 of the extension and causes a frothing of the supply of milk. The mixture of steam and air prevents penetration of milk into the extension 35 (via discharge opening 36) so that milk cannot deposit and incrustate at the inner side of the extension to clog or to partially obstruct the flow of steam via orifice 29 and/or the flow of air via outlet 32.

The configuration and/or dimensions of the extension 35 can depart from those shown in FIGS. 3–9 without departing from the spirit of the invention. For example, the extension 35 of FIG. 4a can constitute a separately produced nipple with an externally threaded upper end portion extending into the internally threaded lower end of the portion 39 of the conduit 23. Furthermore, the improved attachment can be used with equal or similar advantage in espresso machines which depart from those shown in FIGS. 1 and 3. The extension 35 of FIG. 9 can be secured to the nozzle 26 by a bayonet mount or in any other suitable way. Moreover, the espresso machine which employs the structure of FIG. 9 can be furnished with several exchangeable extensions 35 each of which defines a different space for the mixing of steam and air prior to admission of the resulting mixture into a body of skim milk or other milk which is available for the making of cappuccino coffee. The extension can be made of a metallic or of a plastic material.

A valve (such as the valve 50 of FIG. 6) can be used in each embodiment of the improved attachment to regulate the rate of flow of air into the conduit 30.

If the conduit 23 is sufficiently long, the vessel 34 can be placed in front of the lower section 12 of the housing of the espresso machine. Alternatively, or in addition thereto, the conduit 23 can be assembled of two or more sections which are telescoped into each other so that the nozzle 26 can be lifted above the vessel 34 while the latter rests on the cover 15 or in front of the section 12. The conduit 3o shares the movements of the lowermost telescoped section of the conduit 23.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An espresso machine comprising a housing; a coffee filter carrier on said housing; a source of steam in said housing; steam supplying first conduit means connected with said source and having a steam discharging orifice and being immersible into a supply of milk; and air supplying second conduit means having an air discharging outlet sufficiently close to said orifice to enable steam which issues from said orifice to draw air from said second conduit means by way of said outlet and into the supply of milk when the first conduit means is immersed into the supply of milk to thereby cause a frothing of milk as a result of admission of steam and air into milk.

2. The machine of claim 1, wherein said orifice is oriented to discharge steam downwardly.

3. The machine of claim 1, wherein said second conduit means comprises a first end portion provided with said outlet and a second end portion having an air admitting inlet.

4. The machine of claim 1, further comprising means for locating said second conduit means with reference to said first conduit means.

5. The machine of claim 4, wherein said locating means includes means for connecting said second conduit means to said first conduit means.

6. The machine of claim 5, wherein said connecting means includes means for separably coupling said second conduit means to said first conduit means.

7. The machine of claim 5, wherein said first conduit means includes an elongated portion and said connecting means includes means for coupling the second conduit means to said first conduit means for movement along the elongated portion of said first conduit means.

8. The machine of claim 1, wherein said orifice and said outlet are oriented to respectively discharge steam and air downwardly.

9. The machine of claim 1, wherein said first conduit means includes a substantially straight portion which is adjacent said orifice and said second conduit means includes a substantially straight first portion adjacent and substantially parallel with said portion of said first conduit means and an arcuate second portion which is provided with said outlet and extends in front of said orifice so that stream issuing from said orifice flows around the outlet.

10. The machine of claim 1, further comprising a vessel arranged to store the supply of milk, said extension being arranged to dip into the supply of milk in said vessel so that frothing of milk in said vessel is caused by the mixture of steam and air which issues from said extension.

11. The machine of claim 10, further comprising a vessel arranged to store a supply of milk, said extension being arranged to dip into the supply of milk in said vessel so that the mixture of steam and air which issues from said extension causes a frothing of milk in said vessel.

12. The machine of claim 10, wherein said first conduit means includes a portion adjacent said extension and an internal partition between said portion and said extension, said orifice being provided in said partition.

13. The machine of claim 12, wherein said second conduit means includes an end portion adjacent said extension and provided with said outlet, said extension having a tubular wall provided with an aperture in register with said outlet.

14. The machine of claim 13, wherein said aperture is located between said partition and said discharge opening.

15. The machine of claim 10, wherein said conduits include pieces of tubing which are adjacent and parallel to each other.

16. The machine of claim 15, wherein said pieces of tubing are connected to each other.

17. The machine of claim 15, wherein said pieces of tubing have identical or similar inner and outer diameters.

18. The machine of claim 10, wherein said conduit means are integral with each other and further comprising means for coupling said first conduit means to said source.

19. The machine of claim 1, wherein said second conduit means is an integral part of said first conduit means and has an air admitting inlet remote from said outlet and a channel connecting said inlet with said outlet.

20. The machine of claim 19, wherein said first conduit means is elongated and said channel extends longitudinally of said first conduit means.

21. The machine of claim 1, wherein said first conduit means comprises an end portion which is provided with said orifice and further comprising a discrete extension having a first portion surrounding said end portion in the region of said orifice and a second portion having a discharge opening spaced apart from said orifice, said second conduit means being arranged to discharge air into the second portion of said extension.

22. The machine of claim 21, wherein the second portion of said extension has an aperture and said outlet communicates with said aperture so that air which is admitted into said extension is mixed with steam issuing from said orifice before the resulting air-steam mixture leaves said extension by way of said discharge opening.

23. The machine of claim 21, wherein said end portion includes a hollow cone and the first portion of said extension includes a funnel which receives said cone.

24. The machine of claim 1, wherein said second conduit means has an air admitting inlet and further comprising means for regulating the flow of air into said second conduit means by way of said inlet.

25. The machine of claim 24, wherein said regulating means includes a valve.

26. The machine of claim 25, wherein said valve has a rotary valving element.

* * * * *